US005084965A

United States Patent [19]
Zimmern

[11] Patent Number: 5,084,965
[45] Date of Patent: Feb. 4, 1992

[54] PROCESS TO CUT HOUR GLASS SCREWS

[76] Inventor: Bernard Zimmern, c/o SSCI 2 Reynolds St., East Norwalk, Conn. 06855

[21] Appl. No.: 683,874

[22] Filed: Apr. 11, 1991

[51] Int. Cl.$^5$ .............................................. B23F 15/08
[52] U.S. Cl. ........................................ 29/889.23; 409/48
[58] Field of Search ................... 409/10, 12, 48, 25, 409/26, 50, 51, 131, 132; 29/889.2, 888.023, 888.02, 889.23, 889.7, 889; 418/195, 185

[56] References Cited

U.S. PATENT DOCUMENTS 2,603,412  7/1952  Chilton .......................... 418/195
4,034,645  7/1977  Keijer ............................ 409/10

FOREIGN PATENT DOCUMENTS 2821433  12/1978  Fed. Rep. of Germany ........ 409/26
7408947   1/1976  Netherlands ..................... 409/26
745612    7/1980  U.S.S.R. ......................... 409/12

Primary Examiner—William Briggs
Attorney, Agent, or Firm—Young & Thompson

[57] ABSTRACT

Method and device for grooving an hourglass screw wherein a tool shaft having an axis transverse to the screw blank has a tool movable selectively stepwise relative to the shaft when the tool is not engaged with the screw blank and locking means fix the tool when engaged with the screw blank for the grooving operation.

4 Claims, 4 Drawing Sheets

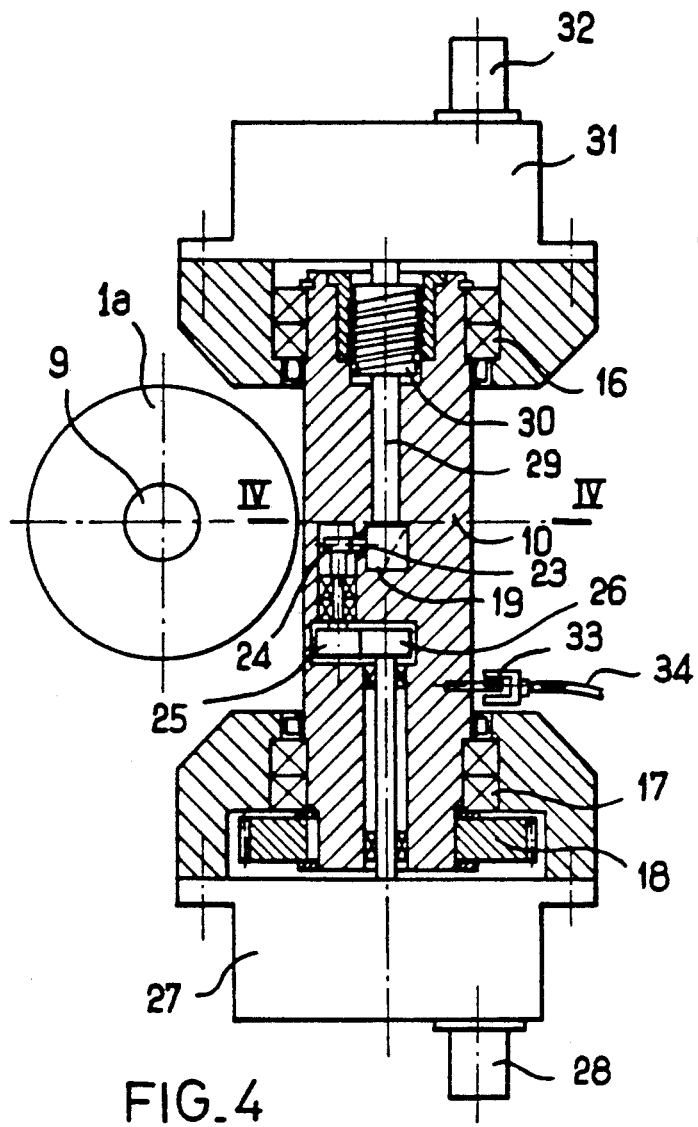
FIG_4
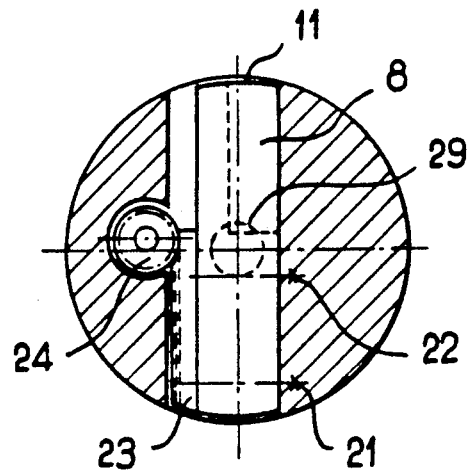
FIG_5
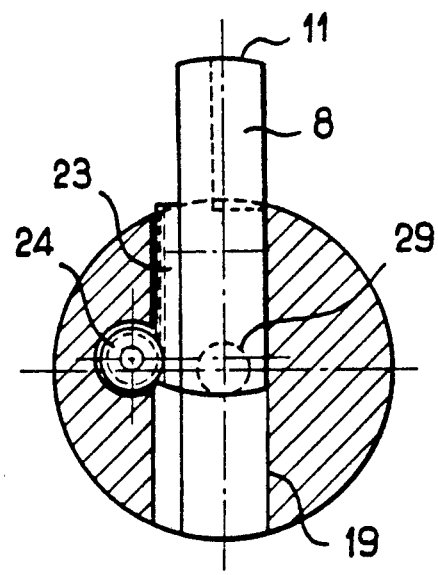
FIG_6
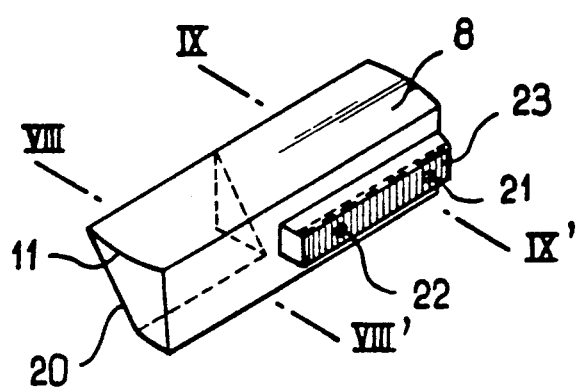
FIG_7
FIG_9
FIG_8

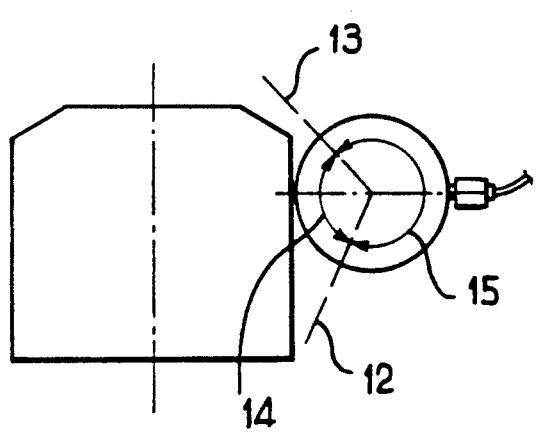
FIG_10
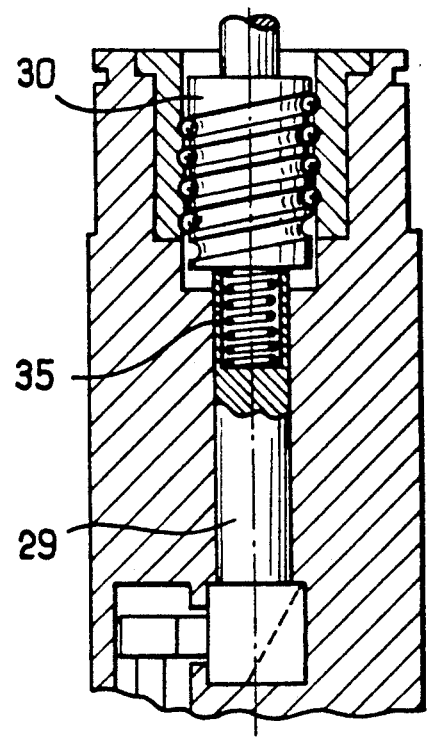
FIG_11
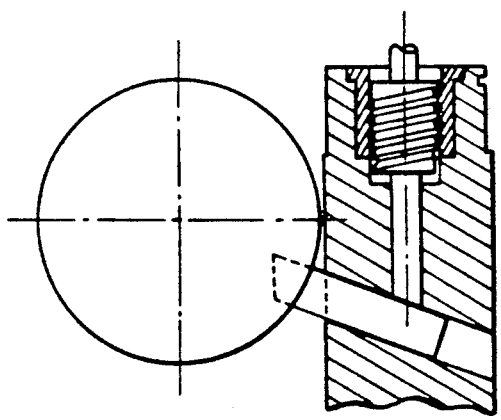
FIG_12
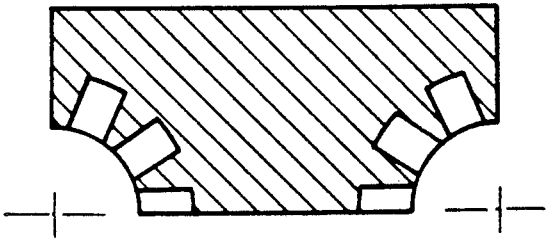
FIG_13
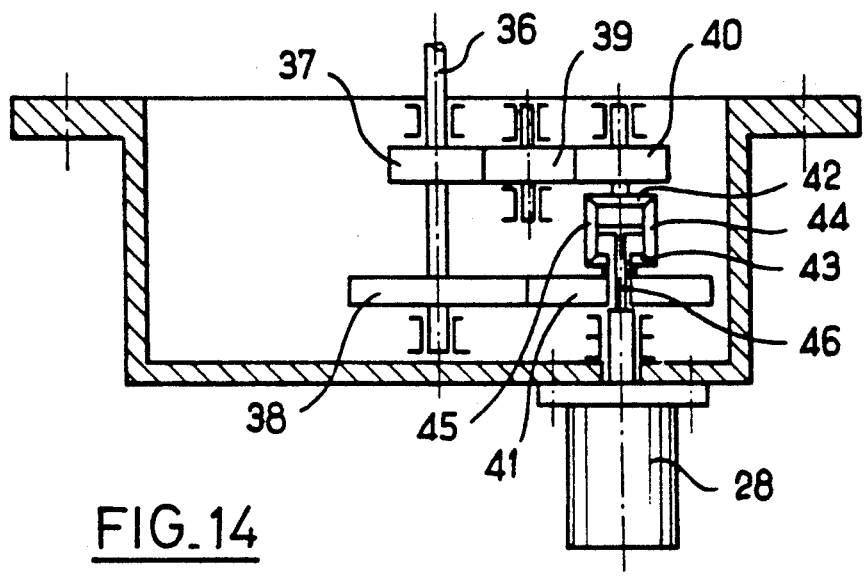
FIG_14

PROCESS TO CUT HOUR GLASS SCREWS

It is known to cut hour glass screws, also called double enveloped worm gears, by using a hob having the conjugate profile of the screw groove, putting the screw blank and the hob on a gear hobbing machine, the blank and the hob being rotated in a synchronized fashion by a gear train and moving the hob into the blank to progressively fashion the groove.

This process is not possible for screws such as shown on the U.S. Pat. Nos. 3,180,565 or 3,632,239 because the hob cannot move into or out of the screw without removing portions of the thread which should remain untouched.

A process has been shown in U.S. Pat. No. 3,932,077 which eliminates this basic problem by using rotating milling cutters which can profile the shape but it has been found to reduce machining time it is necessary to remove most of the metal of the groove by different means and use the milling cutter just as a finishing operation.

One desirable way to rough shape the groove would be to use an expandable tool similar to a tooth of the generator and expand it out progressively into the groove.

U.S. Pat. No. 2,603,412 shows such a process, particularly in its FIGS. 8 and 9.

Unfortunately the process and apparatus so described are incapable of achieving the depth of the groove needed for a viable commercial product.

To be commercially viable i.e. to achieve a gas flow sufficiently large for a given compressor size and hence a viable compressor cost, all single screw compressors built in the last twenty years achieve a depth of penetration of the groove of at least 20% of the screw diameter.

Also, more precisely, in order to maintain the gaterotor within reasonable dimensions and minimize the size of the compression, all machines are built with a distance between axis of screw and gaterotor of 80 if the screw diameter is 100, and gaterotor diameter between 100 and 105.

The consequence is that the core of the gaterotor inside the teeth has a radius of 80 minus the radius of screw i.e. 30. So to grow a tool like a tooth, the tool has to expand from a radius of 30 to a maximum radius of around 52-53 i.e. an expansion covering around 22 to 23 out of a shaft of which the diameter is at maximum 60.

This means that the tool has to grow around 38% of the maximum shaft diameter.

If one accounts for the fact that some safety space must be left between the tool holder and the screw and that some length of a new tool should be able to be removed for resharpening, it appears that the total available displacement needed for a tool from the time it is fully hidden inside the tool shaft and the time it is fully out is at minimum around 45% of the shaft diameter.

In this respect the prior art as shown in the aforesaid U.S. Pat. No. 2,603,412 is useless as the maximum growth is around 25% and a compressor built with corresponding groove depth would be without any commercial value.

When trying to increase the amount of expansion along the solution shown in said patent, this has the consequence of reducing the embedding of the tool inside the shaft, thereby leading to vibrations, chattering etc.; but of greater consequence, it reduces the surface area between the tool and the part which pushes the tool out; even though other systems are conceivable, they all are hitting the same obstacle which is clear on the aforesaid patent when a vertical rod built inside the shaft pushes through a rack another rack made into the tool; when trying to increase the amount of expansion, one is lead to reduce the width of the rod and the rack and over 30% expansion, a fortiori 45%, the width of the rack left on the vertical rod becomes incapable of withstanding the considerable forces which are created on the tool, axially to push the tool inside the metal. In fact, the width becomes zero well before the expansion achieves 45%.

This invention has for its object the process to groove an hourglass screw consisting of the steps of setting a screw blank on a first shaft, having a second shaft transverse to the first shaft, setting a tool inside the second shaft, setting expansion means inside said second shaft to locate the position of said tool, rotating the two shafts in a synchronized way, starting the grooving with the tool retracted inside said second shaft, locking the tool to the second shaft at least while the tool is engaged inside the blank, actuating the expansion means to feed the tool out when the tool is out of engagement with the blank and unlocking at least partly the tool, at least when actuating the expansion means, and expanding the tool by a succession of sequences of locking, unlocking and expansion until full tool penetration in the screw is achieved.

Indeed, the tool is not engaged all the time inside the screw and hence the load mentioned earlier happens only during part of the rotation. It is hence possible to use the time while the tool is out of the screw to expand the tool out, to extend it by the amount of feed that machining rules allow, generally values around 50 to 100 microns but have the tool rigidly secured to its shaft at the time it starts cutting.

In this way, not only are chattering and vibration eliminated during cutting due to the rigidity of the whole cutting system but the area needed between the tool and its actuation system can be considerably reduced; this not only allows for the possibility of giving the extra amount of growth, it also eliminates the wear which would appear if the moving surface had to bear the load of the cutting thrust; it also allows as it will appear in the description to use for instance racks which are not part of the tool itself, can be attached and moved from one tool to the next one thereby considerably simplifying the manufacture of the tool itself.

In a preferred embodiment of this invention, the mechanism which solidly secures the tool in the tool holder when the tool is cutting is only partly relaxed when the tool is out of the screw.

It has indeed been found that when the tool is out of the screw, if its expansion mechanisms is let without some internal tension, the play in the expansion mechanism leads to an inaccuracy in the position of the tool when the locking mechanism is applied and from one position to the next, those inaccuracies can be much greater than the amount of feed, thereby leading the tool to sometimes cut nothing, sometimes cut chips many times the thickness allowed by manufacturing rules; this reflects into excessive load on the tool with accelerated wear and even tool breakage.

The present invention shall be better understood by reading the following description and accompanying drawings given as a non-limiting example where FIG. 1 shows a screw partly in elevation, partly in cross section manufactured according to the invention, cooperating with one gaterotor.

FIG. 4 is a cross section of a tool shaft according to the invention.

FIGS. 5 and 6 are cross sections of FIG. 4 along IV—IV'

FIG. 7 is a perspective view of a tool

FIG. 8 and 9 are cross section of FIG. 7

FIG. 10 is a diagrammatic representation of the process according to the invention FIG. 11 is a preferred modification of FIG. 4

FIG. 12 shows the application of the invention to a different gaterotor shape.

FIG. 13 shows the cross section of a screw which can be machined by the same invention.

FIG. 14 shows the differential mechanism used in the invention.

In this particular example, the screw carries 6 grooves and the gaterotor 11 teeth but the invention could be applied to other combinations.

In the compressor (or expander) where the screw cooperates with the gaterotor, they rotate respectively around axis 4 and 5.

In a typical machine if the screw diameter is 100 (whatever the unit is), the distance between axis 4 and 5 would be around 80, the gaterotor diameter 100 to 105 and hence the maximum depth of penetration of the tooth shown in 6 is 20 to 22.5; the core of the gaterotor i.e. the plain portion without teeth indicated in dotted line 7 has a radius of 80-50 i.e. 30 or a diameter of 60.

Figure 2:
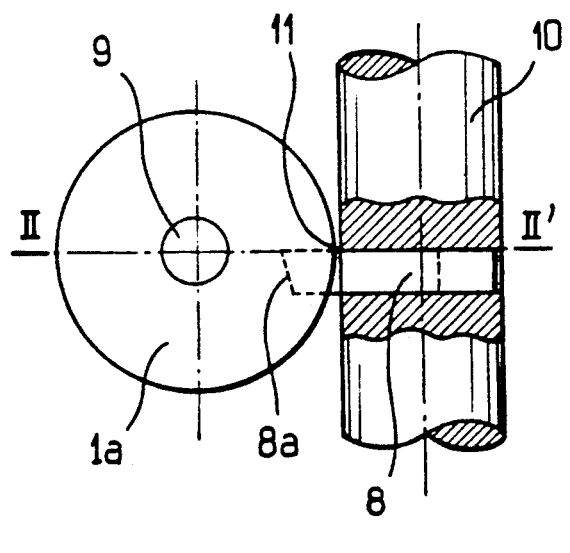
FIG. 2 and 3 shows diagrammatically the cutting process FIG. 2 being a cross section along III—III' of FIG. 3 and FIG. 3 being a cross section of FIG. 2 along II—II'.
Figure 3:
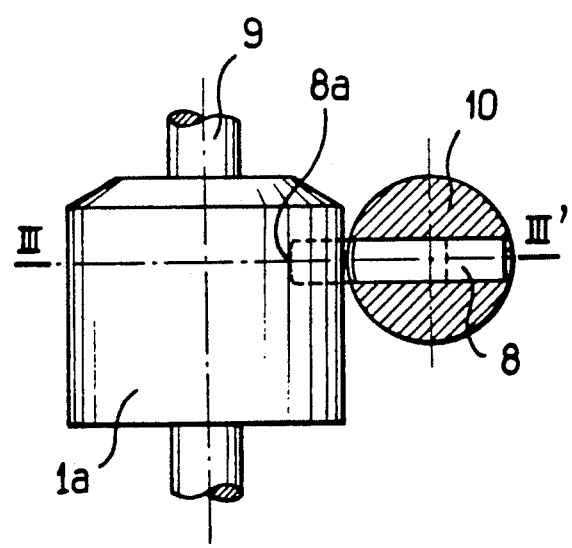

FIG. 2 and 3 shows diagrammatically the cutting operation by an expandable tool 8.

One can see on FIGS. 2 and 3 that the screw blank 1a is assembled on a first shaft 9 whereas the tool 8 is set in a second shaft 10.

Shaft 9 and 10 are rotated in synchronism by outside means, not shown such as a gear train; in the case of a screw with 6 grooves cooperating with a gaterotor having 11 teeth, the screw shaft 9 makes II turns for 6 turns of shaft 10.

At the beginning of the grooving process, the tool 8 is fully retracted inside the shaft 10 as shown in plain lines. Then by a process which will be described in more details later, the tool is progressively expanded out into the screw by small increments shaving its way inside the groove until the tool 8 reaches its maximum extension shown in dotted line in 8a. The tool is then retracted inside the shaft 10 to allow for the grooving of another screw.

Figure 1:
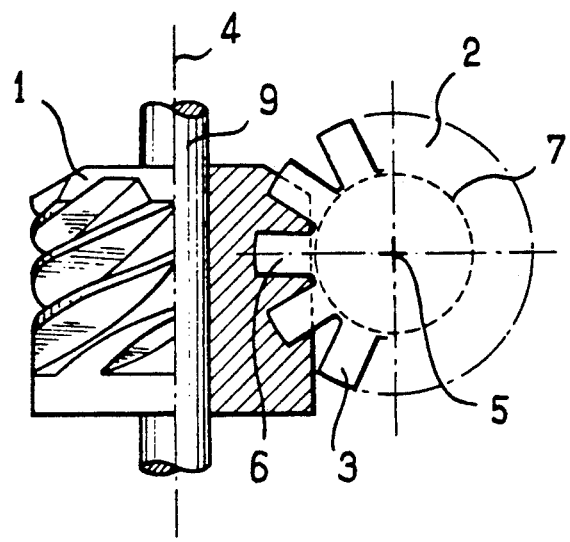
FIG. 1 shows partly in elevation partly in cross section a screw 1 manufactured according to the invention, cooperating with a gaterotor 2 carrying teeth such as 3.

It is apparent from looking to FIG. 1 that the shaft 10, in the area where the tool is located, must have a diameter smaller than the diameter of circle 7 of FIG. 1 i.e. smaller than 60 if the screw diameter is 100.

As the depth of penetration of 20 to 22.5 has to be achieved, this means that the tool must expand 22.5; i.e. over 38% of the diameter of the shaft 10 which is 60.

As there has to be some play for safety between the blank 1a and the shaft 10, as the tool needs from time to time to have its cutting edge 11 resharpened by grinding and therefore is reduced in length even though it must still protrude out of the shaft by the same amount the total amount of expansion distance needed is not 38% of the diameter of shaft 10 but at least 45%.

This means that the tool is practically half out of the shaft.

Systems such as described in U.S. Pat. No. 2,603,412 are incapable of achieving such amount of displacement; the rod supporting the rack which moves the tool out would simply disappear.

Another problem is that the tool being half out, its engagement inside its shaft is half of its length and whatever the precision with which its passageway is made and the precision of the fit of the tool inside such passageway, some clearances are inescapable and this leads to tool chatter and vibration which are unacceptable for the tool life, not to mention the deterioration of the passageway itself.

The invention eliminates this problem.

FIG. 10 shows the two angular positions 12 and 13 where the tool starts engaging the cut into the screw and is leaving the screw. In other words, in the angular range shown by circular arrow 14, the tool in under cutting load but in the angular range 15 the tool is out of the blank and is free of any cutting load.

The invention is to take advantage of the existence of these two different states and have locking means which secure solidly the tool to the shaft at least during the position 14, release the locking means during at least part of the time to tool is in the angular sector 15 and when the locking means are released, provide the tool with the amount of feed necessary to expand the tool out.

As typical values, with a screw having a diameter of 200 millimeters, a typical chip thickness or feed would be 50 to 100 microns or 0.05 to 0.10 millimeters.

In the case of screws with 6 grooves cooperating with 11 teeth gaterotors, where the tool automatically visits each of the 6 grooves before coming back in to the same groove, it is either possible to give to the tool a feed of 50/6 to 100/6 microns at each turn of the tool shaft; or to give a feed of 50 to 100 microns every six turns of the shaft 10.

A remarkable result of this solution, besides the increased expansion, is that it removes completely the load from the mechanism feeding the tool; when the feeding occurs, the tool is indeed out of the screw and there is no axial load pushing the tool; on the contrary when the tool is engaged in the blank, there is a high load on the cutting edge and substantial thrust to repulse the tool inside its cavity; but the tool being locked to the shaft by the locking means, this thrust is not felt by the feeding mechanism which therefore can be built light without the risk of breakage or wear, in fact allows the feeding mechanism to be manufactured independently of the tool and just attached to it, thereby leading to the use of inexpensive tools.

The functioning of the invention is explained in more detail on FIG. 4 which is a longitudinal cross section of a shaft 10 according to the invention; FIG. 5 and 6 being partial cross section of FIG. 4 along IV—IV' showing the tool in its retracted (FIG. 5) and most expanded positions (FIG. 6).

One can see on FIG. 4 the shaft 10 supported by bearings 16 and 17 and driven in rotation by gear 18 itself connected to the shaft 9 supporting the blank 1*a* by a gear train not shown.

In shaft 10 is a passageway 19 made for instance by EDM (electro discharge manufacture) in which the tool 8 can slide.

The tool, in FIG. 7, has a cutting edge 11 and at least on part of its length, a bevel 20, so as to conform in a well known manner, with the slope of the thread it is carving in the blank. FIG. 8 and 9 show cross section by VIII—VIII' and IX—IX' of FIG. 7 of the tool.

On the side of the tool is attached by bolts 21 and 22 a rack 23 which, as shown on FIG. 4, can be moved by a set of gears such as 24, 25, 26 itself turning together with the shaft 10 but which can be angularly moved with respect to the shaft 10 by a conventional differential mechanism 27 itself moved by outside means such as an electrical motor 28. So when the shaft 10 is rotating, the tool can be retracted or expanded by rotating the motor 28 in one direction or its reverse direction.

Now on the other end of the shaft 10 there is a piston 29 whose end is visible in dotted lines on FIGS. 5 and 6 and which contacts the top of the tool.

This piston 29 is itself in contact with a screw 30 preferably a ball screw which can be turned by a conventional differential mechanism 31 itself activated by outside means such as an electrical motor 32. An example of such mechanisms as 27 and 31 are described in FIG. 14.

When the motor 32 is energized in one direction, it turns screw 30 which presses the piston 29 itself solidly securing the tool 8 to the shaft 10. When the motor is rotated in the other direction the screw 30 is turned in the other direction and unlocks the piston 29. Through the conventional differential mechanism 31 these motions can happen even when the shaft 10 is rotating.

The shaft 10 carries at least one finger 33 passing inside a proximity switch 34 so that when the shaft 10 is rotating, it is possible to know exactly what is the angular position of the shaft 10.

Other means such as optical discs etc. could be used to measure the angular position of the shaft without changing the invention.

This angular position is then used in the control system of the machine tool to activate the motor 26 and 32 in one direction or the reverse to achieve the proper sequence.

Referring now to FIG. 10, and as an example, every six turns of the shaft 10, when the tool is inside the angular sector 15, the motor 32 is activated to relieve the load on the piston 29; then the motor 28 is activated to push the tool out by the desired feed through the mechanism including elements 27,26,25,24 and 23; then the motor 32 is activated in the reverse direction while the tool is still in the angular sector 15 so as to lock the tool again before it starts cutting inside the screw.

The same sequence is repeated until the tool reaches the final depth penetration.

When the grooving operation is finished, the motor 32 unlocks the piston 29, and the motor 28 is activated until the tool is fully retracted inside the shaft.

FIG. 11 shows a preferred solution of the invention. Between the piston 29 and the screw 30 is set a spring 36 which is designed to be always under compression even when the pressure of the screw 30 is released.

In this way, even when the tool 8 is not securely locked to the shaft 10, there is friction between the tool 8 and the piston 29. This prevents all the elastic tension in the chain of gear and shaft between the motor 28 and the rack 23 to be released when the tool is unlocked and hence prevents the tool to move out by an uncontrolled amount which could lead to excessive cutting feed and, possibly, tool breakage.

FIG. 12 shows that it is possible to apply the invention to a tool which would not have its displacement perpendicular to the axis of shaft 10. FIG. 13 shows that it is possible to use the same tool to make screws of which the outside diameter is not cylindrical but is for instance a position of tore, keeping nevertheless the same proportion of tooth length—or groove penetration—vis-a-vis the gaterotor diameter.

FIG. 14 shows one example of a realization of conventional differential mechanism described as 27 and 31 in the description. The description will be made for the case of differential 27 but applies also to 31.

Shaft 36 drives gear 26 and turns normally together with shaft 10.

Gears 37 and 38 are locked on shaft 36. They respectively drives gears 39, 40, and 41. Gears 39 and 40 have the same number of teeth as gear 37 and gear 41 the same number of teeth as gear 38.

Hence 40 and 41 turn at the same rotational speed but in reverse direction; therefore the gear 42 and 43 turn at the same speed in opposite directions and can cooperate with perpendicular gears 44 and 45 which are free gears but linked by a common T shape shaft 46. When the T shaft 46 is idle, the shaft 36 turns at the same speed as shaft 10. But when the T shape shaft 46 is actuated by a motor 28, this makes the shaft 36 turn relative to shaft 10, thereby creating the differential motion required.

It is clear that the scope of the invention would not be modified if the locking mechanism by a screw would be replaced by different means, for instance a piston 29 pressed by hydraulic means; or if the means to displace the tool would not be a rack and gear but equivalent means such as a finger or a cam or hydraulic piston; or if the tool had a different configuration than the rectangular shape shown in this description, if it had for instance in its plain area—i.e. the portion not engaged inside the screw—a cylindrical shape but would be angularly prevented of rotating, for instance by a key; or if the shafts 9 and 10 shown as perpendicular were simply transverse, i.e. at an angle different from 90°, or if the locking means were used to create friction means by relieving the pressure on the piston 29 but not letting this pressure fall to zero and thereby eliminating the need of spring 35.

Figure 15:
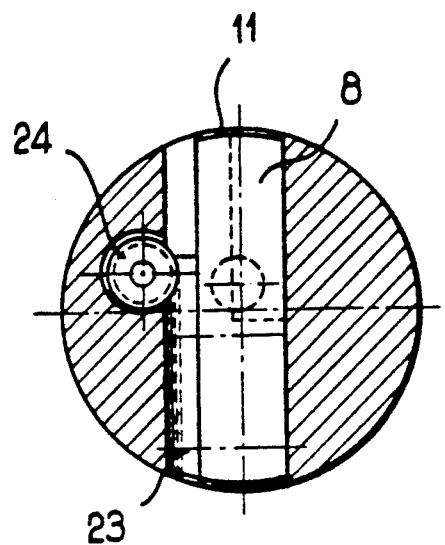
FIG. 15 and 16 show a modified realization of FIGS. 5 and 6.
Figure 17:
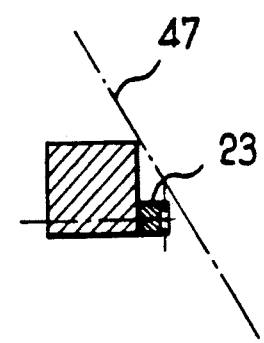
FIG. 17 shows a modified realization of FIG. 9.
Figure 16:
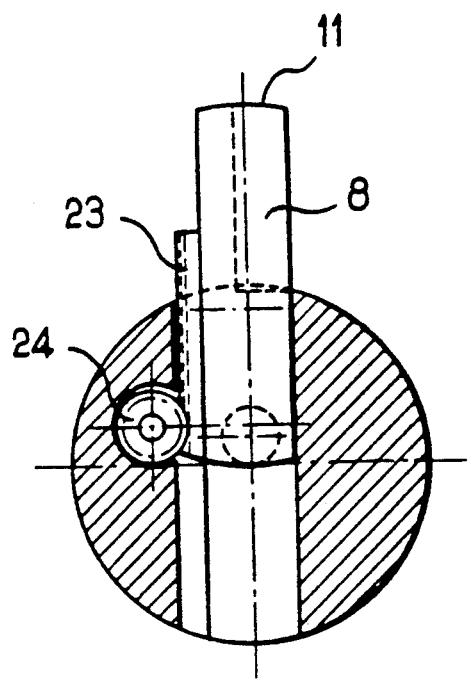

FIGS. 15 and 16 show a modified version of FIG. 5 where the pinion 24 is moved toward the cutting edge 11 of the tool and the piston 29 is moved in the same direction. Simultaneously, as shown on FIG. 17, the rack 23 is displaced so that it can protrude into the groove cut by the tool without touching the thread; to achieve that result as the thread has inclination (hence the bevel described on FIG. 8) it is needed that the rack 23 be disposed outside the dotted line 47 which shows the minimum angle of the groove wall; if that condition is satisfied, the rack can protrude without damage. This modification allows the tool to expand out of the shaft by an amount of 50% of the shaft diameter.

I claim:

1. Process to groove an hourglass screw consisting of the steps of setting a screw blank on a first shaft, having a second shaft transverse to the first shaft, setting a tool inside the second shaft, setting expansion means inside said second shaft to locate the position of said tool, rotating the two shafts in a synchronized way, starting the grooving with the tool retracted in said second shaft, locking the tool to the second shaft at least while the tool is engaged inside the blank, actuating the expansion means to feed the tool out when the tool is out of engagement with the blank and unlocking at least partly the tool, at least when actuating the expansion means, and expanding the tool by a succession of sequences of locking, unlocking and expansion until full tool penetration in the screw is achieved.

2. Process according to claim 1 where, when the tool is out of engagement with the blank, it is only partly unlocked.

3. Screw cutting machine to perform the process according to claim 1 comprising a first shaft for the screw blank, a second shaft for the tool, transverse to said first shaft, means to synchronize the rotation of the two shafts with the proper speed ratio, a channel inside the second shaft transverse to the axis of said shaft, a tool in sliding engagement inside said channel, moving means to displace said tool inside said channel, locking means to securely lock said tool to said second shaft and means to detect the angular position of said second shaft and to actuate said moving means when said locking means are unlocked.

4. Screw cutting machine according to claim 1 including friction means against the tool.

* * * * *